Patented Aug. 30, 1938

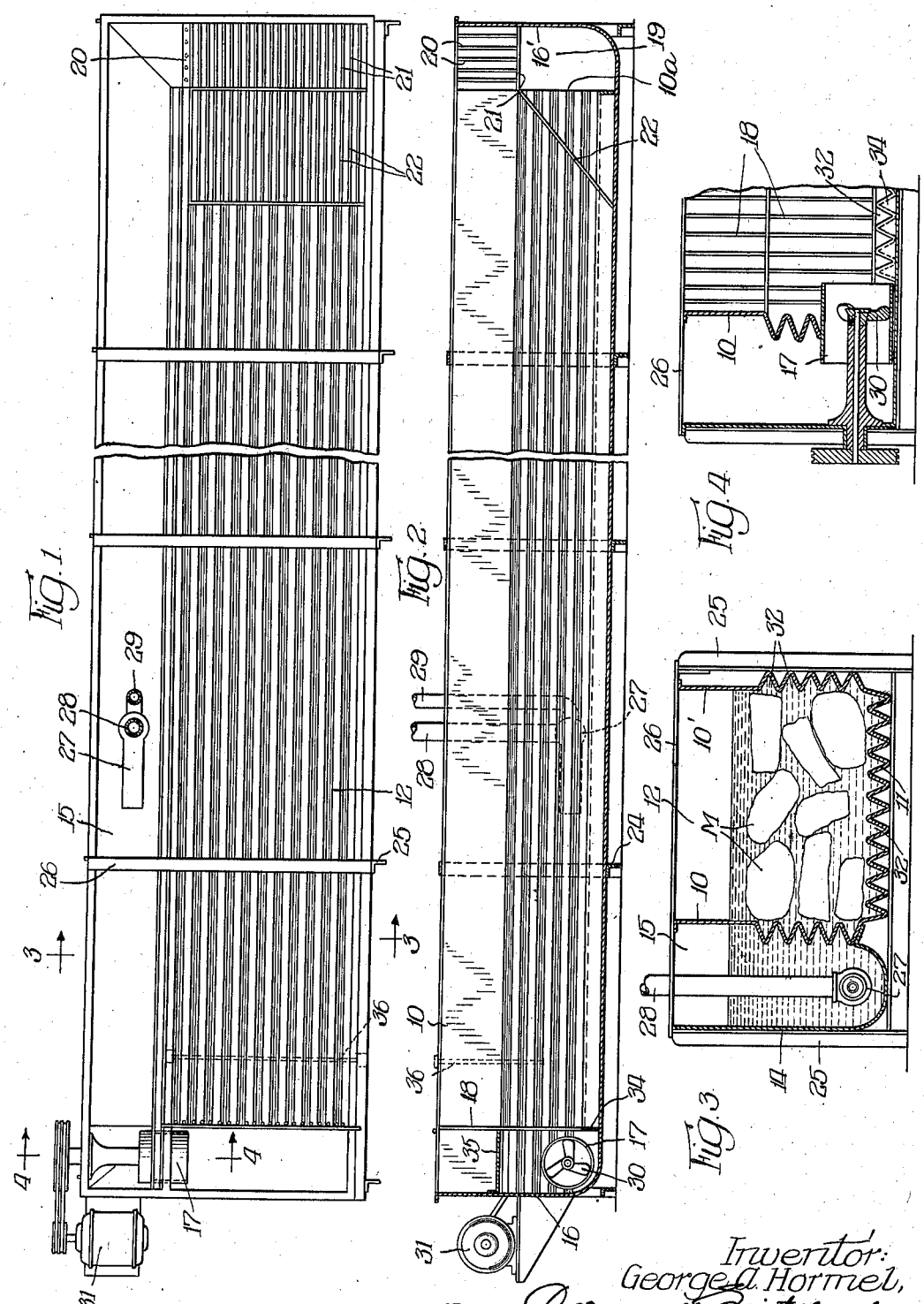

2,128,728

UNITED STATES PATENT OFFICE 2,128,728

APPARATUS FOR DEFROSTING MEAT

George A. Hormel, Austin, Minn., assignor to Geo. A. Hormel & Company, Austin, Minn., a corporation of Delaware Application May 19, 1937, Serial No. 143,423

5 Claims. (Cl. 99—234)

The proper curing of meat, such as the curing of hams, bacon, and the like, by pickling, smoking, etc., requires a considerable period of time, and cannot be completed as rapidly as the animals can be slaughtered and the various parts dressed suitably for curing. Whereas curing may be carried on continuously throughout the year, the slaughtering of animals is of seasonal occurrence. For example, hogs normally are ready for the market and are sold to packers during only certain seasons, and it is desirable, from the standpoint of economy and for the purpose of obtaining the best quality in the finished product, to slaughter and dress them promptly. Consequently, during the slaughtering periods, the dressed meat is placed in cold storage, where it is frozen for preservation, and this cold storage stock is drawn upon throughout the balance of the year to supply the requirements for curing.

Since the meat in cold storage is kept in a frozen condition, it is necessary to thaw or defrost it before it is subjected to the curing treatments. Such defrosting heretofore has usually been accomplished by spreading the frozen meat in a heated room until it thaws, or by soaking it in vats of heated water. Defrosting by such procedures is slow, exposes the meat to bacterial action, and affects it deleteriously in various other ways.

The general object of the present invention is the provision of an apparatus for the defrosting of meat and the like whereby the thawing may be accomplished rapidly and completely with a minimum of handling and with minimum injury to its character and quality.

Another object is the provision of such apparatus whereby minimum space and time are required for the defrosting of large quantities of meat, by virtue of the fact that the procedure is of a continuous character, as distinguished from a batch treatment.

Another object is the provision of such an apparatus whereby the respective pieces of meat may be treated uniformly, as distinguished from some being overtreated while others are undertreated.

Other and further objects of the invention will be pointed out or indicated hereinafter or will be apparent to one skilled in the art upon an understanding of the invention or its employment in use.

For the purpose of aiding in an explanation of the invention, I show in the accompanying drawing forming a part of this specification one form of apparatus which, as hereinafter described, will serve to exemplify the nature and practice of the invention. It is to be understood, however, that this is presented merely by way of illustration and is not to be construed in any fashion calculated to limit the appended claims short of the true and most comprehensive scope of the invention in the art.

In said drawing,

Fig. 1 is a shortened top or plan view of a defrosting apparatus constructed and operable in accordance with my invention;

Fig. 2 is a longitudinal vertical sectional view of same;

Fig. 3 is a transverse sectional view of same on approximately line 3—3 of Fig. 1 but on a larger scale; and Fig. 4 is a part transverse sectional view of same on approximately line 4—4 of Fig. 1.

In general, an apparatus according to the invention may be described as a long tank of trough-like character subdivided longitudinally into two compartments which are in communication at their ends, one of the compartments being adapted to receive the pieces of frozen meat and to hold a quantity of water suitable to cover them, and the other compartment constituting a return flow channel whereby water may be led from one end of the defrosting compartment to the other. In this return flow compartment are provided means for supplying heat to the water, and in connection with both compartments is provided means for inducing circulation of the water longitudinally of the two compartments. The walls of the defrosting compartment are formed with longitudinally extending channels which are in communication with said compartment and which serve as flow spaces which permit water to pass the pieces of meat which are in the compartment.

The character of the invention will be more fully understood from the following detailed description of the apparatus illustrated in the drawing and the procedure carried out therein.

The reference characters 10 and 10' designate the side walls and 11 the bottom wall of a long trough-like structure which forms the treating compartment 12. The reference character 14 designates the outer side wall of the return flow compartment 15 which extends alongside the treating compartment 12 and is separated therefrom by the wall 10. End walls 16 and 16' connect the side walls 14 and 10' and form the ends of the tank. This tank may be of any desired length, e. g., 50 to 60 feet, and the treating compartment 12 of sufficient depth and width to accommodate three or four hams one beside another and one below another. The end of the tank closed by the end wall 16 is the charging end, and that closed by the wall 16' is the discharge end. The tank structure is supported, reinforced, and held in position by bottom stay members 24, side stay members 25, and top stay members 26.

At the charging end, a sleeve 17 is mounted in in aperture in the lower portion of the wall 10 and forms a communication between the treating compartment 12 and the return flow compartment 15. Adjacent the side of the sleeve opposite the wall 16 a grating 18 is interposed across the end of the treating compartment 12. The wall 10 terminates at 10a at a distance from the end wall 16', leaving an aperture 19 which affords communication between the treating compartment 12 and the return flow compartment 15. This aperture 19 is screened off from the treating compartment by a grating comprising a vertical portion 20 across the upper part of the aperture, a horizontal portion 21 across the discharge end of the compartment 12, and a sloping portion 22 which extends down from the horizontal portion 21 to the bottom wall of the treating compartment.

In the bottom of the return flow compartment 15 is disposed the nozzle or outlet 27 of equipment for supplying water and steam, the water supply pipe being illustrated at 28 and the steam supply pipe at 29. This nozzle forms a mixing and injecting device whereby water introduced thereinto is heated by steam injected into it, and the heated water directed into the charging end of the tank.

In the sleeve 17 is positioned an impeller 30, which is arranged to be suitably driven as by a motor 31.

The side walls 10 and 10' and bottom wall 11 of the treating compartment are corrugated or otherwise formed or fitted to provide a plurality of relatively narrow channels 32 extending longitudinally of and in communication with said compartment. The channels in the bottom wall 11 terminate somewhat short of the end walls 16 and 16', and the spaces between the inwardly opening channels are closed at their ends by suitably shaped plates 34 or in other appropriate fashion. While in the embodiment illustrated the channels 32 are shown in the form of corrugations in the sheet metal walls 10, 10' and 11, it will be understood that they may be formed in various other ways.

In the operation of the apparatus the treating compartment and return flow compartment 15 are filled to a suitable depth with water which is introduced by the line 18 and heated to a suitable temperature in the mixing and injecting device 27 by steam introduced through the line 29. The impeller 30 is suitably actuated to propel water from the compartment 15 through the sleeve 17 and into the charging end of the compartment 12. As a result, the water is caused to flow longitudinally in the treating compartment from its charging end to its discharge end, from which it passes into the return flow compartment 15 through the aperture 19. The pieces of frozen meat, for example, the green hams, belly pieces for bacon, and the like, are charged into the compartment 12 adjacent the grating 18. While their specific gravity may be such that they sink, they have enough buoyancy to permit their being propelled along toward the discharge end of the tank by the current induced by the impeller 30. The treating compartment is thus charged with pieces of frozen meat in sufficient number to occupy it from side to side and to the desired depth, with a suitable depth of water over the topmost pieces, somewhat as illustrated in Fig. 3 wherein the pieces of meat are designated M. The pieces of meat gradually progress toward the discharge end, where the foremost pieces are stopped by the grating 22. As they thus progress they are completely bathed by the heated water which flows in contact with and past them continuously at a considerably greater speed than they themselves travel. As a consequence, the pieces of meat are defrosted very rapidly, as each piece is being continuously contacted by hot water and the cooled water is continuously moving on away from it. Accordingly, by the time a piece of meat has reached the grating 22, it is substantially defrosted and if not completely so, may be left in the tank until it is in proper condition. Thereupon it is withdrawn upon the grating 21 and removed from the tank.

Accordingly, by heating the water to the proper temperature and circulating it at the proper rate, the procedure may be carried on in such fashion that the pieces may be removed at the discharge end of the tank practically as fast as they arrive there, and the frozen pieces may be put into the tank at the charging end as rapidly as there is space for them. Thus the procedure may be carried on as a continuous operation, thawed pieces being removed and frozen pieces being supplied at the same time.

The cooled water which passes into the return flow compartment through the aperture 19 flows continuously toward the charging end of the tank and may be continuously reheated by introduction of hot steam through the device 27, even though no additional water is supplied.

When the treating compartment is fully charged and the operation going on as above described, it is kept filled to the proper depth with pieces of meat from end to end. Of course, due to their buoyancy and irregular shapes, the pieces of meat do not pack tightly, although they occupy the greater proportion of the submerged space. With the tank thus charged the pieces of meat very appreciably retard the flow of the water, and would tend more or less to dam up the hot water toward the charging end of the tank were it not for the flow channels 32. These afford continuous unobstructed spaces through which the hot water may flow rapidly along the sides and bottom of the treating compartment throughout its entire length, and the rapid flow thus afforded by these channels has the effect of imparting turbulence and impulse to the water which is among the pieces of meat, thus distributing the hot water throughout the volume of the compartment and maintaining a proper flow to carry the cooled water along to the discharge end.

It will be appreciated, accordingly, that by use of the apparatus and procedure above described, the pieces of meat may be defrosted completely and uniformly at a very rapid rate, the pieces being carried along to the place of discharge at the same time that they are being defrosted. Consequently, it is rendered unnecessary to subject smaller pieces to excessive soaking in water to give larger pieces the necessary time for complete defrosting.

To avoid excessive surface turbulence of the water at the charging end when the impeller is operating at a high speed, a baffle plate 35 may be arranged over the outlet end of the sleeve 17, as shown in Fig. 1; and to avoid back eddying at the charging end of the tank, a depending baffle may be arranged as shown at 36 at a short distance from the impeller, said baffle extending part way the depth of the treating compartment. The pieces of meat are placed in the treating compartment at the side of the baffle 36 opposite the end wall 16.

It is to be understood that the apparatus is adapted for use for purposes other than the defrosting of meat, such as the de-salting of meat or the like, by suitable modification of the procedure, such as by withdrawing the salty water continuously from the discharge end of the treating compartment and supplying fresh water continuously at the charging end.

The method hereinabove described constitutes the subject matter of a divisional application Serial No. 216,871, filed July 1, 1938.

What I claim is:

1. Apparatus for defrosting meat and the like, comprising a treating compartment in the form of an elongate horizontal trough having end walls and having longitudinal walls formed with narrow inwardly opening channels extending lengthwise thereof, a return flow compartment extending lengthwise said treating compartment, communicating passages being provided at both ends of said compartments for flow of water from each to the other, and means for propelling water from the return flow compartment into the treating compartment at one end thereof to maintain a continuous flow of water longitudinally in the latter through said channels and the trough space.

2. Apparatus for defrosting meat and the like, comprising a treating compartment having end walls and longitudinal walls arranged to form an elongate horizontal trough, one or more of said longitudinal walls being provided with narrow inwardly open channels extending lengthwise thereof, a return flow compartment extending longitudinally of said treating compartment, communicating passages being provided at both ends of said compartments whereby water may pass from each to the other, and means operable to propel water from the return flow compartment through one of said passages into one end of the treating compartment to produce a flow of water longitudinally in the channels and trough of the treating compartment and into the opposite end of the return flow compartment.

3. Apparatus for defrosting meat and the like, comprising elongate trough-like treating and return flow compartments extending parallel with each other in horizontal position, an in-flow passage being provided to conduct water from the return flow compartment into one end of the treating compartment, said compartments being in communication with each other at the opposite end through an out-flow passage adjacent their bottoms, means for applying heat to water in the return flow compartment, at least one longitudinal wall of the treating compartment being formed with narrow channels extending longitudinally thereof and open to said compartment, and means for inducing flow of water from the return flow compartment into the treating compartment through said in-flow passage to cause flow longitudinally in the treating compartment and said channels.

4. Apparatus for defrosting meat and the like, comprising an elongate horizontal trough-like receptacle sub-divided by a longitudinal partition into a treating compartment and a return flow compartment extending side by side, said partition having apertures at its ends to afford flow communication between the compartments, at least one of the longitudinal walls of the treating compartment being formed with relatively narrow channels extending lengthwise thereof and open to said compartment, means for applying heat to water in the return flow compartment, means for propelling water from the return flow compartment into the treating compartment through the aperture at one end thereof to cause a flow lengthwise in the treating compartment and said channels, and a barrier extending across and to the bottom of the treating compartment adjacent and ahead of the aperture at the other end thereof.

5. Apparatus for defrosting meat and the like, comprising an elongate horizontal receptacle forming a trough with side, bottom and end walls, the side and bottom walls being provided with narrow channels extending lengthwise thereof and open to the trough, a return flow compartment extending along the trough and communicating therewith at both ends, and means for propelling water from the return flow compartment into one end of the trough to induce flow of water longitudinally in the latter and in said channels.

GEORGE A. HORMEL.